June 23, 1959     A. SWANSON     2,891,393

QUICK DISCONNECTING FLEXIBLE COUPLING

Filed April 25, 1958

INVENTOR.
Arthur Swanson
BY
ATTORNEYS

000
United States Patent Office 2,891,393
Patented June 23, 1959

2,891,393

QUICK DISCONNECTING FLEXIBLE COUPLING

Arthur Swanson, Towson, Md., assignor to Poole Foundry & Machine Company, Baltimore, Md., a corporation of Maryland Application April 25, 1958, Serial No. 730,847

3 Claims. (Cl. 64—8)

This invention relates to flexible couplings and particularly concerns the connection between driving and driven sleeves surrounding driving and driven hubs in a gear type flexible coupling.

Usually, in couplings of this type, driving and driven hubs are surrounded by sleeves connected together by bolts extending through abutting flanges of the sleeves. These bolts serve the dual function of transmitting torsional forces from the driving sleeve to the driven sleeve and also retain the sleeves against relative axial displacement. Since the torsional forces are often of considerable magnitude, a number of bolts are spaced around the annular flanges of the sleeves and are tightened to an extent that removal is time consuming and difficult in order to disconnect the sleeves and permit repair or replacement of units of the coupling.

It is a major object of this invention to provide a connection between the driving and driven sleeves of a gear type flexible coupling which is capable of transmitting large torsional forces and may be easily and quickly released to permit separation of the sleeves so either the driving or the driven unit may be removed and a spare installed quickly. A related object of the invention is to provide a connection between the sleeves which may be quickly and easily assembled.

In the attainment of these objects, an important feature of the invention resides in the arrangement of interlocking elements on abutting faces of the driving and driven sleeves for transmitting torsional forces between the sleeves and swing bolts on the outer surface of the sleeves connecting the sleeves and securing them against relative axial displacement. As the axial forces are small as compared to the torsional forces, only a few swing bolts need be employed and these need not fit or be tightened to the extent of the through bolts of conventional couplings.

Other objects, advantages and features of the invention will become apparent from the following specification taken in conjunction with the accompanying drawings wherein.

Figure 1:
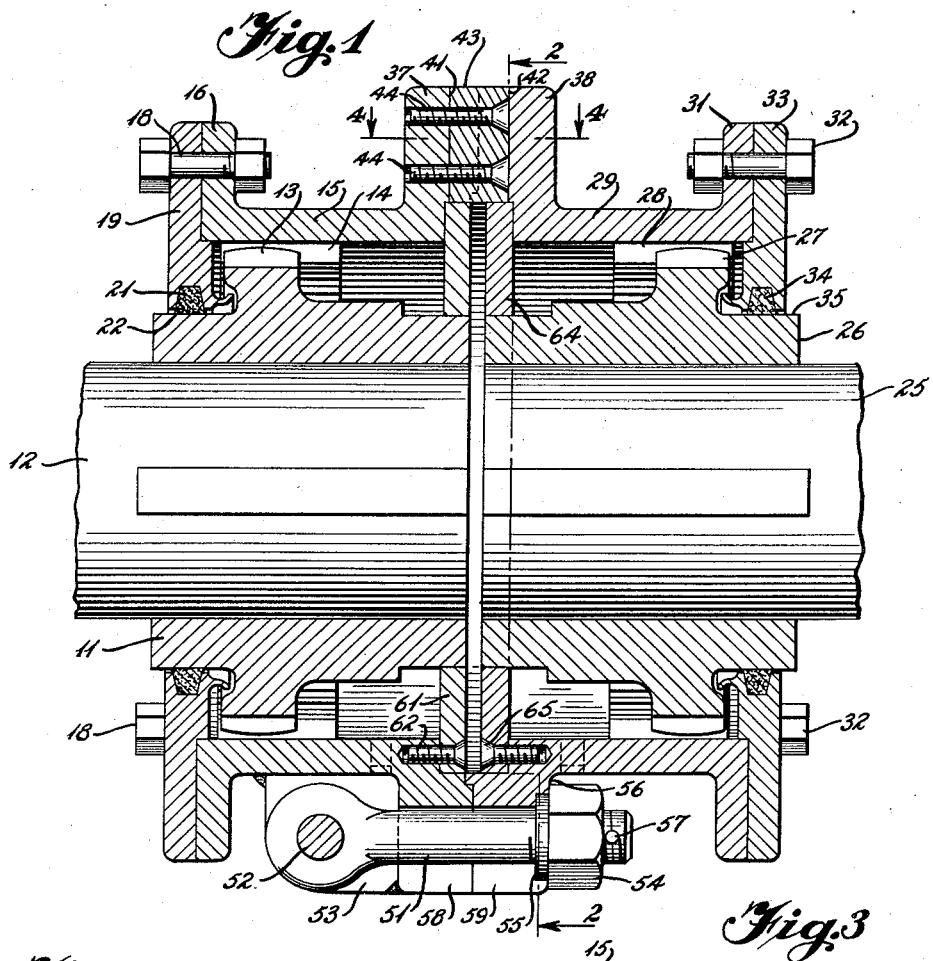
Fig. 1 is a sectional view of a flexible coupling embodying the invention in its preferred form.

As illustrated, most of the parts of the coupling are conventional in that a driving hub 11 is fitted on and keyed to the end of a driving shaft 12. On the periphery of driving hub 11 are spherical teeth 13 meshing with corresponding teeth 14 on the internal surface of a driving sleeve 15. At one end driving sleeve 15 has an outward extending annular flange 16 to which is secured, as by bolts 18, 18, a lubricant retaining ring 19 having an oil seal 21 fitted in the recess in the inner periphery of the ring and riding on a shoulder 22 of the hub 11. The driven unit is similar to the driving unit in that the end of shaft 25 carries a driven hub 26 keyed to the shaft 25 and provided on its periphery with spherical teeth 27 meshing with corresponding teeth 28 on the inner surface of a driven sleeve 29. On the end of driven sleeve 29 is an outwardly projecting annular flange 31 to which is secured as by bolts 32, 32 a lubricant retaining ring 33 having a seal 34 riding on a shoulder 35 of the driven hub 26.

On the ends of driving and driven sleeves 15 and 29 opposite the oil retaining rings 19 and 33 are outwardly extending abutting annular flanges 37 and 38 formed respectively with aligned radially extending recesses 41 and 42. A key 43 is fitted in the recess 41 of the driving sleeves 15 and secured therein as by bolts 44, 44. When assembled as shown in the drawings, driving sleeve 15 and driven sleeve 29 are arranged so the recess 42 accommodates the key 43. As many keys 43 may be spaced circumferentially about the face of flange 37 as may be necessary to transmit torsional forces between driving sleeve 15 and driven sleeve 29, as illustrated, for example, in Fig. 2.

For the purpose of retaining flanges 37 and 38 in abutment and preventing relative axial movement of driving sleeve 15 and driven sleeve 29, one of the sleeves carries one or more swing bolts 51 with a nut engaging an abutment on the other sleeve. In the drawings, the swing bolt 51 is shown pivoted on a pin 52 extending between ears 53 on the outer surface of driving sleeve 15 between the flanges 16 and 37. Flanges 37 and 38 are provided with slots 58 and 59 into which the bolt 51 may swing about its pivot 52. When assembled as shown in the drawings, bolt 51 extends through the slot and is secured by a lock nut 54 and washer 55 abutting the inner surface 56 of the flange 38. A cotter key 57 may be inserted in the end of swing bolt 51 to retain the lock nut 54.

Figure 2:
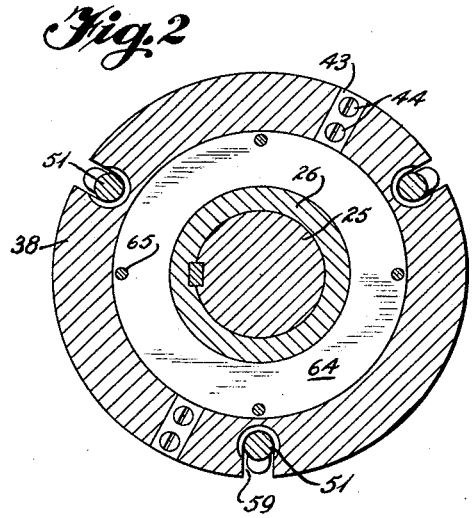
Fig. 2 is a cross-sectional view, on a reduced scale, taken on the line 2—2 of Fig. 1.
Figure 3:
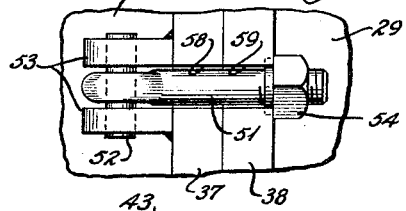
Fig. 3 is a partial bottom view of the coupling shown in Fig. 1.
Figure 4:
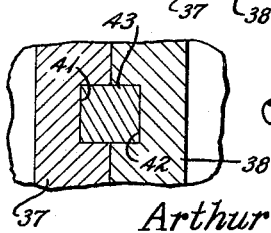
Fig. 4 is a fragmentary sectional view taken on the line 4—4 of Fig. 1.

Any desired number of swing bolts 51 may be used as indicated in Fig. 2. These swing bolts serve solely the purpose of retaining the driving and driven sleeves 15 and 29 against relative axial displacement. Since these bolts do not transmit torsional forces between the sleeves, and since axial forces are relatively small, the bolts need not be heavy, need not be turned tightly, as in the case of through bolts for transmitting torque, and can readily be loosened to swing away and permit axial shifting of one sleeve or the other. Thus, to remove one of the units, it is only necessary to relieve a pair of nuts 54, swing the bolts 51 away from the slots in the flanges of the sleeves and then shift the sleeves axially. After the unit is replaced, the sleeves may be readily secured together with the keys 43 interlocking in the recesses 41 and 42 of the respective sleeves to transmit torsional forces between the sleeves. For the purpose of retaining oil in the unit when the sleeves are separated, driving sleeve 15 has an oil retaining plate 61 secured as by bolts 62 to a shoulder in the flange 37 and driven sleeve 29 has an annular oil retaining plate 64 secured as by bolts 65 to a shoulder on the flange 38.

As many variations in construction will be apparent to those skilled in the art, the foregoing description and accompanying illustration of a preferred embodiment of

What is claimed is:

1. A flexible coupling comprising a driving hub for attachment to a driving shaft, a driven hub for attachment to a driven shaft, a driving sleeve surrounding said driving hub and torsionally coupled thereto, a driven sleeve abutting said driving sleeve surrounding said driving hub and torsionally coupled thereto, interlocking elements between said abutting sleeves for transmitting power therebetween, and swing bolts securing said sleeves against relative axial movement with said interlocking elements engaged.

2. A flexible coupling as defined in claim 1 wherein rings are interposed between the ends of said sleeves and said hubs for enclosing the chamber formed thereby to retain lubricant therein.

3. A flexible coupling as defined in claim 1 wherein said swing bolts are pivotally coupled to one of said sleeves and engage lugs on the other of said sleeves.

References Cited in the file of this patent

UNITED STATES PATENTS

| | | |
|---|---|---|
| 1,781,032 | Redfield | Nov. 11, 1930 |
| 2,121,507 | Morgan | June 21, 1938 |